(12) United States Patent
Von Haden et al.

(10) Patent No.: US 11,126,648 B2
(45) Date of Patent: Sep. 21, 2021

(54) AUTOMATICALLY LAUNCHED SOFTWARE ADD-INS FOR PROACTIVELY ANALYZING CONTENT OF DOCUMENTS AND SOLICITING USER INPUT

(71) Applicant: MICROSOFT TECHNOLOGY LICENSING, LLC, Redmond, WA (US)

(72) Inventors: Kyle Matthew Von Haden, Dublin (IE); Igor Ralic, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 195 days.

(21) Appl. No.: 15/923,962

(22) Filed: Mar. 16, 2018

(65) Prior Publication Data

US 2019/0179653 A1    Jun. 13, 2019

Related U.S. Application Data

(60) Provisional application No. 62/598,459, filed on Dec. 13, 2017.

(51) Int. Cl.
*G06F 16/36* (2019.01)
*G06F 16/31* (2019.01)
(Continued)

(52) U.S. Cl.
CPC ............ *G06F 16/36* (2019.01); *G06F 3/0482* (2013.01); *G06F 3/0483* (2013.01);
(Continued)

(58) Field of Classification Search
CPC .......... G06F 16/36; G06F 9/453; G06F 16/31; G06F 3/0482
(Continued)

(56) References Cited

U.S. PATENT DOCUMENTS 5,287,278 A    2/1994 Rau
5,787,451 A *  7/1998 Mogilevsky .......... G06F 17/273
                                            715/257

(Continued)

FOREIGN PATENT DOCUMENTS

WO    1997038376 A2    10/1997
WO       0041095 A2     7/2000
WO    2009041220 A1     4/2009

OTHER PUBLICATIONS

"How to Install and Use Add-ins for Microsoft Office"; Chris Hoffman; How to Geek; <https://www.howtogeek.com/260569/how-to-install-and-use-add-ins-for-microsoft-office/>; published Jul. 5, 2016 (Year: 2016).*

(Continued)

*Primary Examiner* — Stephen S Hong
*Assistant Examiner* — Broderick C Anderson
(74) *Attorney, Agent, or Firm* — Newport IP, LLC; Jacob P. Rohwer

(57) ABSTRACT

The following disclosure describes software components, such as add-ins, that are launched automatically, without being manually activated by a user. In some embodiments, the add-in may run silently, e.g. the add-in runs in the background, without displaying content in an ancillary pane. The add-in may be given access to document content, enabling pre-processing as well as decorating document content with metadata for future use. The add-in may determine that the document has met a criteria, and in response, display a visual cue directing the user to activate the add-in. When a user does manually activate the add-in by clicking on an icon or pressing a keyboard shortcut, the add-in may be pre-loaded, initialized, and have already accessed and processed document content. In this way, the add-in may display useful content in an ancillary pane in (Continued)

much less time, solving the technological problem of delay between manual activation and initialization of an add-in.

19 Claims, 9 Drawing Sheets

(51) Int. Cl.

| | | |
|---|---|---|
| *G06F 9/451* | (2018.01) | |
| *G06F 3/0482* | (2013.01) | |
| *G06Q 10/10* | (2012.01) | |
| *G06F 40/30* | (2020.01) | |
| *G06F 40/106* | (2020.01) | |
| *G06F 40/134* | (2020.01) | |
| *G06F 40/232* | (2020.01) | |
| *G06F 40/242* | (2020.01) | |
| *G06F 40/247* | (2020.01) | |
| *G06F 40/253* | (2020.01) | |
| *G06F 3/0483* | (2013.01) | |
| *G06F 3/0484* | (2013.01) | |
| *G06F 9/445* | (2018.01) | |
| *G06F 9/50* | (2006.01) | |
| *G06F 9/54* | (2006.01) | |
| *G06F 11/30* | (2006.01) | |
| *G06F 40/166* | (2020.01) | |

(52) U.S. Cl.
CPC ...... *G06F 3/04842* (2013.01); *G06F 9/44526* (2013.01); *G06F 9/453* (2018.02); *G06F 9/5038* (2013.01); *G06F 9/541* (2013.01); *G06F 11/302* (2013.01); *G06F 16/31* (2019.01); *G06F 40/106* (2020.01); *G06F 40/134* (2020.01); *G06F 40/232* (2020.01); *G06F 40/242* (2020.01); *G06F 40/247* (2020.01); *G06F 40/253* (2020.01); *G06F 40/30* (2020.01); *G06Q 10/10* (2013.01); *G06F 40/166* (2020.01)

(58) Field of Classification Search
USPC ........................................................ 715/710
See application file for complete search history.

(56) References Cited

U.S. PATENT DOCUMENTS

| | | | |
|---|---|---|---|
| 6,199,081 B1 | 3/2001 | Meyerzon et al. | |
| 6,535,906 B1 | 3/2003 | Barber et al. | |
| 6,785,869 B1* | 8/2004 | Berstis | G06F 17/241 |
| | | | 715/210 |
| 7,136,876 B1 | 11/2006 | Adar et al. | |
| 7,236,923 B1* | 6/2007 | Gupta | G06F 17/277 |
| | | | 704/7 |
| 7,793,224 B1 | 9/2010 | Ayers | |
| 8,316,007 B2 | 11/2012 | Liao | |
| 8,667,487 B1* | 3/2014 | Boodman | G06F 21/53 |
| | | | 717/178 |
| 8,739,249 B1* | 5/2014 | Kay | G06F 21/00 |
| | | | 709/217 |
| 9,020,805 B2 | 4/2015 | Boguraev et al. | |
| 9,098,500 B1 | 8/2015 | Asokan et al. | |
| 9,311,286 B2 | 4/2016 | Bank et al. | |
| 9,864,741 B2 | 1/2018 | Mahmud et al. | |
| 10,789,147 B1 | 9/2020 | Patzer et al. | |
| 2002/0059251 A1 | 5/2002 | Stern et al. | |
| 2004/0205672 A1* | 10/2004 | Bates | G06F 40/232 |
| | | | 715/256 |
| 2005/0165778 A1 | 7/2005 | Obata et al. | |
| 2005/0240664 A1 | 10/2005 | Chen et al. | |
| 2007/0016625 A1 | 1/2007 | Berstis | |
| 2007/0124375 A1 | 5/2007 | Vasudevan et al. | |
| 2007/0174045 A1 | 7/2007 | Kao et al. | |
| 2008/0059539 A1 | 3/2008 | Chin et al. | |
| 2008/0086297 A1 | 4/2008 | Li et al. | |
| 2008/0159633 A1* | 7/2008 | van Eikeren | G06F 17/211 |
| | | | 382/209 |
| 2009/0313245 A1 | 12/2009 | Weyl et al. | |
| 2010/0318897 A1 | 12/2010 | Wang | |
| 2011/0047457 A1 | 2/2011 | Flint et al. | |
| 2011/0320408 A1 | 12/2011 | Grosse et al. | |
| 2011/0320459 A1 | 12/2011 | Chisholm | |
| 2012/0109974 A1 | 5/2012 | Feng et al. | |
| 2012/0278694 A1 | 11/2012 | Washio | |
| 2012/0290950 A1 | 11/2012 | Rapaport et al. | |
| 2013/0110500 A1 | 5/2013 | Feng et al. | |
| 2013/0191739 A1 | 7/2013 | Bank et al. | |
| 2014/0074860 A1 | 3/2014 | Medelyan | |
| 2014/0074886 A1 | 3/2014 | Medelyan et al. | |
| 2015/0066480 A1 | 3/2015 | Endo et al. | |
| 2015/0088493 A1 | 3/2015 | Thakore | |
| 2015/0234809 A1 | 8/2015 | Moore et al. | |
| 2015/0309667 A1* | 10/2015 | Wang | G06F 9/451 |
| | | | 715/781 |
| 2015/0317390 A1 | 11/2015 | Mills et al. | |
| 2016/0105386 A1 | 4/2016 | Anders et al. | |
| 2016/0283839 A1 | 9/2016 | Ye et al. | |
| 2017/0199963 A1 | 7/2017 | Kondadadi et al. | |
| 2018/0004547 A1* | 1/2018 | Hayes | G06F 16/2358 |
| 2018/0196921 A1 | 7/2018 | Devarakonda et al. | |
| 2019/0179680 A1 | 6/2019 | Von Haden et al. | |
| 2019/0179898 A1 | 6/2019 | Jetley et al. | |
| 2019/0179958 A1 | 6/2019 | Curzi et al. | |

OTHER PUBLICATIONS

"Non Final Office Action Issued in U.S. Appl. No. 15/912,076", dated Jul. 26, 2019, 8 Pages.

"Non-Final Office Action Issued in U.S. Appl. No. 15/951,086", dated Sep. 19, 2019, 18 Pages.

"International Search Report & Written Opinion for PCT Patent Application No. PCT/US18/062387", dated Feb. 15, 2019, 11 Pages.

"International Search Report & Written Opinion for PCT Patent Application No. PCT/US18/062388", dated Feb. 15, 2019, 12 Pages.

"Notice of Allowance Issued in U.S. Appl. No. 15/912,076", dated Feb. 10, 2020, 10 Pages.

Bhawani, et al., "A Linguistically Driven Framework for Query Expansion via Grammatically Constituent Highlighting and Role-Based Concept Weighting", In Journal information Processing and Management vol. 52, Issue 2 , Mar. 2016, 19 Pages.

James, et al., "Extraction and Disambiguation of Acronym-Meaning Pairs in Medline", In Journal of Medinfo vol. 10, 2001, 2001, 11 Pages.

"Non Final Office Action Issued in U.S. Appl. No. 15/963,029", dated Nov. 18, 2019, 25 Pages.

"International Search Report and Written Opinion Issued in PCT Application No. PCT/US2018/062386", dated Feb. 12, 2019, 10 Pages.

"International Search Report and Written Opinion Issued in PCT Application No. PCT/US18/061894", dated Feb. 12, 2019, 10 Pages.

"Final Office Action Issued in U.S. Appl. No. 15/951,086", dated Apr. 20, 2020, 24 Pages.

"Final Office Action Issued in U.S. Appl. No. 15/963,029", dated Apr. 20, 2020, 10 Pages.

"Non Final Office Action Issued in U.S. Appl. No. 15/951,086", dated Oct. 14, 2020, 27 Pages.

McCombs, et al., "WebGUI Administrators Guide", Published by Plain Black Corporation, Sep. 2007, 250 Pages.

Namatame, et al., "A Distributed Resource Management Architecture for Interconnecting Web-of-Things using uBox", In Proceedings of Second International Workshop on Web of Things, Jun. 2011, 6 Pages.

(56) References Cited

OTHER PUBLICATIONS

"Notice of Allowance Issued in U.S. Appl. No. 15/951,086", dated Apr. 7, 2021, 16 Pages.

* cited by examiner

AUTOMATICALLY LAUNCHED SOFTWARE ADD-INS FOR PROACTIVELY ANALYZING CONTENT OF DOCUMENTS AND SOLICITING USER INPUT

CROSS-REFERENCE TO RELATED APPLICATIONS

This application claims the benefit of U.S. provisional patent application No. 62/598,459, entitled "RESUMPTION OF ACTIVITIES USING ACTIVITY DATA COLLECTED BY AN OPERATING SYSTEM", which was filed on Dec. 13, 2017, and which is expressly incorporated herein by reference in its entirety.

BACKGROUND

Software add-ins provide specialized features to existing computer applications. For instance, some software add-ins can enable customization and third-party extensibility of a stand-alone application, such as a word processing application or presentation application. Software add-ins are typically launched in response to a specific user activation event, e.g. clicking on a menu item, or activating a shortcut key. For example, a spell-checker add-in for a word processor may be launched in response to a user clicking on a "spell check" icon in an add-in menu, or launched in response to a user pressing a keyboard shortcut such as "ctrl+alt+'S'." Add-ins are often designed to interact with a user via an ancillary pane which is displayed in response to the user activation event. These add-ins may be tied to the lifetime of that ancillary pane, such that the add-in is deactivated when the ancillary pane closes.

Launching add-ins using the methods described above can cause a perceptible delay between the user activation event and when the add-in is initialized and able to perform useful work. This delay is a technological challenge to the functioning of the computing device. In order to illustrate this problem, consider the case of a web/cloud-based word processor having a word consistency add-in launched by a user. In response to a user activation, the word processor loads the add-in into memory, which often requires downloading a script file, compiling the script file, and allocating local computing resources. This process may take hundreds of milliseconds, many seconds, or more, depending on network speed and local processing power. Furthermore, once instantiated, the word consistency add-in may analyze tens, hundreds, or even thousands of pages of document content, causing even greater delay and user frustration as the analysis completes.

Another challenge presented by traditional software add-in architectures is an ongoing issue with feature discovery. Often, even if an add-in is installed, a user will not know how to activate it. Furthermore, even if a user knows how to activate an add-in, the user may not know when it would be useful to do so. For example, a user may invoke a word consistency add-in when, after scanning the document, the word-consistency add-in fails to find a word spelled inconsistently. Repeatedly activating an add-in that provides no meaningful result may cause user frustration. It has been a technological challenge to identify which features of an application or an add-in a user may benefit from, and how to direct users to activate those features.

It is with respect to these and other technical challenges that the disclosure made herein is presented.

SUMMARY

The following disclosure provides software components, such as add-ins, that are launched automatically, without being manually activated by a user. In some embodiments, the add-in may run silently, e.g. the add-in runs in the background, without displaying content in an ancillary pane. The add-in may automatically obtain access to document content, enabling pre-processing of the document contents as well as populating document content with metadata for future use. As such, even when a user does subsequently manually activate the add-in by clicking on an icon or pressing a keyboard shortcut, the add-in may be pre-loaded, initialized, and the content displayed to the user, the add-in can then have the ability to access and process document content. In this way, the add-in may display useful content to the user in an ancillary pane in much less time, solving the technological problem of delay between manual activation and initialization of an add-in.

In some embodiments, an add-in displays a visual cue directing a user's attention to a feature of the add-in or content that may be of interest to the user. Once the user's attention is directed to a feature of the add-in, the user can then manually activate one or more functions of the add-in. The visual cue may indicate how to activate the add-in, e.g. the visual cue may bring highlight or direction to a menu item in a menu structure in which the add-in may be activated. The visual cue may also indicate how the user might benefit from functions of the add-in. For example, an add-in may analyze a document and display a visual cue indicating there were "7 acronyms found" suggesting activation of aspects of an acronyms add-in. An add-in may determine when to reach out to a user and provide a notification based on document content, user interaction with the document, whether the add-in has been used recently, whether the add-in has been used at all, etc. In this way, the technological problem of effectively identifying which features of an application a user may benefit from, and how to direct users to activate those features, is solved.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicates similar or identical items. References made to individual items of a plurality of items can use a reference number with a letter of a sequence of letters to refer to each individual item. Generic references to the items may use the specific reference number without the sequence of letters.

FIG. 5 illustrates the application after a user has activated an icon associated with an acronym add-in.

FIG. 6 illustrates the application after a user has activated an icon associated with a word consistency add-in.

DETAILED DESCRIPTION

Figure 1:
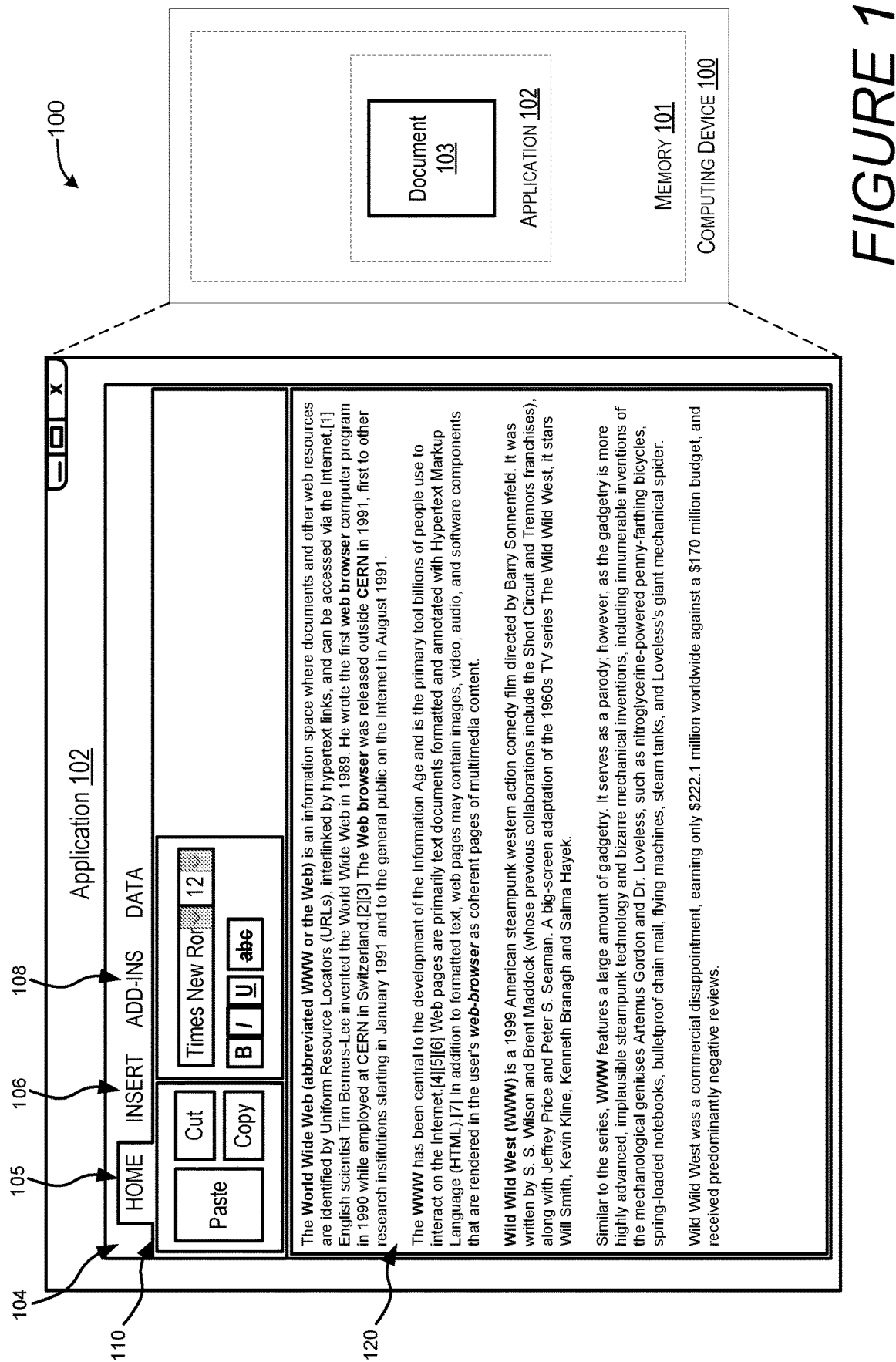
FIG. 1 illustrates an application containing a software add-in tab executing on a computing device containing a memory.

The following disclosure provides software components, such as add-ins, that are launched automatically concurrently with launch of a computer application, without being manually activated by a user. In some embodiments, the add-in may run silently, e.g. the add-in runs in the background, without displaying content to a user in an ancillary pane. The launched add-in may be given access to document content, enabling pre-processing as well as decorating document content with metadata for future use. As such, when a user does manually activate the add-in by clicking on an icon or pressing a keyboard shortcut (to make it apparent to the user), the add-in may become visible, pre-loaded, initialized, and having already accessed and processed document content. In this way, the add-in may display useful content to the user in an ancillary pane in much less time, solving the technological problem of delay between manual activation and initialization of an add-in.

One example of an add-in is an acronym add-in that scans documents for acronyms, e.g. "EDC", and displays a list of identified acronyms and their expansion(s) (e.g. "European Development Center", "Error Detection and Correction", etc.) in an ancillary pane.

In some embodiments, a host application initializes a list of add-ins upon application launch. The host application may create icons for each add-in, such that a user may later activate add-ins that have already been running silently. At the same time, one or more of the list of add-ins may be launched silently. In some embodiments, an add-in is launched silently by loading the add-in into a sandbox that does not provide a user-interface, even if the add-in would otherwise display a user interface. Additionally or alternatively, the add-in that is launched silently may generate user interface elements (e.g. HTML elements) that are hidden, collapsed, not attached to a window, or otherwise not visible. In this way, the add-in may generate these user interface elements in memory, without rendering them for display. As such, when an add-in is activated, displaying the add-in in an ancillary pane may in part include rendering these non-rendered user interface elements, reducing latency and increasing responsiveness to the user activation.

In some embodiments, add-ins may be launched based on a trigger other than application launch. For example, an add-in may be launched in response to a user action such as opening a document, introducing a new type of content into the document (e.g. pasting a spreadsheet table into a word document), or the like.

In some embodiments, the launched add-in will stay initialized in the background, ready to receive and process messages from the underlying application. In this way, when a user manually activates the add-in, the add-in will be able to display content very quickly, often as soon as the ancillary pane is displayed. For example, in the context of an add-in that displays acronyms and expansions, the recognized acronyms and expansions will be displayed much more quickly than if the add-in had to process the entire document in response to the user manually activating the user interface element.

In some embodiments, after add-in initialization is complete, the silently running add-in may respond to different triggering events: document open events, document edited events, and user actions. For example, on document open events, in some embodiments, the underlying application traverses the opened document and provides a message to the add-in for each section (e.g. word, line, paragraph, column, page, chapter, etc.) in the document. The add-in may process these sections in turn in preparation for the user to activate the add-in. At the same time, events provided by the underlying application may alert the add-in when a section is changed (e.g. added, removed, altered), or after a defined number of sections have changed.

In some embodiments, an add-in may stay loaded and active after a user has dismissed a visible manifestation of the add-in. For example, if a user closes an ancillary pane containing an acronym identifier, the add-in may continue executing silently in a sandbox, and as such is not deactivated when the ancillary pane is closed. This enables the add-in to continue to receive and process document changes for the duration that the document is being edited.

Launching add-ins when the underlying application is launched, and continuing execution after a user interface element has been dismissed, provides many advantages, enabling add-ins to approach the functionality of built-in features. However, by nature of being added into the application, the application has not been designed to make add-in functionality discoverable, beyond merely listing the add-in in a menu group (e.g. within a home menu group, or within an add-in menu group among other add-ins). For example, an add-in that identifies and displays acronyms may be most appropriate under a references menu, but by nature of being an add-in, may be listed in an add-ins menu alongside spellcheckers, citation tools, and the like. Even if an add-in is included in a relevant menu group, e.g. a spell-checker add-in in a "review" menu group, a user still may have to investigate the relevant menu group, e.g. review some or all of the menu items within the menu group, before discovering the add-in. Furthermore, a user may not know which menu group an add-in appears in, such that the user may have to investigate some or all of the menu groups before discovering the add-in. Lack of discoverability means users will utilize the feature less, there will be less telemetry, and evaluating usage patterns and effectiveness will be more difficult.

Towards this end, in some embodiments, an add-in displays a visual cue directing the user to manually activate the add-in. The visual cue may indicate how to activate the add-in, e.g. where in a menu structure the add-in may be activated. The visual cue may also indicate why the add-in has determined the user might benefit from its activation, e.g. the visual cue may indicate "7 acronyms found" to suggest activating an acronyms add-in. An add-in may determine when to reach out to a user based on document content, user interaction with the document, whether the add-in has been used recently, whether the add-in has been used at all, etc. In this way, the technological problem of effectively identifying which features of an application a user may benefit from, and how to direct users to activate those features, is solved.

In some embodiments the visual cue takes the form of a pop-up window, e.g. a callout balloon, pointing to where in a menu structure the add-in is located. Additionally or alternatively, the visual cue may generate a symbol such as an "!" overlaid on top of the menu containing the add-in.

In some embodiments, instead of displaying the visual cue every time the add-in is launched, or every time a new add-in is installed, the visual cue may be displayed at a point when the add-in has accumulated enough information to provide useful functionality to the user. In this way, drawing attention to the add-in is less likely to annoy the user. Furthermore, by only drawing attention to itself when the add-in has achieved enough metrics to demonstrate that it has useful functionality, users will be more likely to invoke the add-in, knowing that there is a payoff, than if the user were prompted to invoke a piece of functionality that wasn't useful.

In some embodiments, the visual cue may contain information provided by the add-in suggesting its value to the user. For example, a word inconsistency add-in may indicate how many inconsistent spellings of a particular word it has identified, or how many words are being spelled inconsistently.

In the following detailed description, references are made to the accompanying drawings that form a part hereof, and which are shown by way of illustration specific configurations or examples. Referring now to the drawings, in which like numerals represent like elements throughout the several FIGS., aspects of automatically launched software add-ins for proactively analyzing content of documents and soliciting user input will be described.

As used herein, "authoring pane" refers to a window in an application in which content authoring, e.g. creating, editing, deleting, etc. takes place. In some embodiments an authoring pane displays document content. An authoring pane may consume a majority of an application's display space.

As used herein, "ancillary pane" refers to a display window other than the authoring pane. The ancillary pane may be adjacent to the authoring pane or not adjacent (detached) from it. The ancillary pane may partially or completely occlude the authoring pane, or the authoring pane may partially or completely occlude the ancillary pane. The ancillary pane may appear on the same display screen or a different display screen as the authoring pane, and the ancillary pane may be displayed on a plurality of screens, e.g. a presenter at a meeting displaying the document during a presentation while meeting participants are concurrently viewing the ancillary pane on their personal devices. In another embodiment, an ancillary pane is contemplated as a display on an augmented reality device, displaying acronyms expansions to a wearer while they see content being presented. In this embodiment, the ancillary pane is not electronically connected to the authoring pane, but computer vision features of the augmented reality device identify content the wearer is reading (or is exposed to) and supply the identified content to the acronym processing service as discussed herein.

As used herein, "add-in" refers to a software component that provides functionality that works in concert with the functionality of an application. In some cases, the functionality of the add-in can work within an application, but which is not provided by the application itself. Instead, add-ins interact with an add-in interface exposed by the application to utilize the application's object model. In some embodiments, add-ins may be designed to work with different applications, provided the application's object model provides a sufficiently high level of abstraction. Add-ins may be granted various levels of access to an application's object model, in part based on whether an add-in is a first party add-in (i.e. created by the author of the application) or a third party add-in (i.e. created by an author other than the author of the application).

As used herein, "silent" (or background) refers to a mode of execution of an add-in that does not present a user interface. A "silent" mode may be a feature of an add-in, or it may be imposed upon the add-in by the application. In some embodiments, an add-in that presents a user interface when running in a normal (non-silent) mode executes within a sandbox, without presenting a user interface, in silent mode. However, while in silent mode, an add-in may still be loaded, be initialized, access document content, decorate the document with metadata, and perform other tasks in preparation for a user to explicitly activate the add-in.

As used herein, "sandbox" refers to an execution context where an add-in may be executed. An add-in may be executed within a sandbox as an alternative to executing directly within the application. Some sandboxes are restrictive, in that they do not provide all of the functionality the application itself.

As used herein, "activating" an add-in refers to causing the add-in to be displayed in an ancillary pane. In some embodiments activating an add-in entails launching the add-in, as defined below. However, when an add-in has already been automatically launched, activating the add-in may include allowing the already executing add-in to interact with a user interface such as an ancillary pane.

As used herein, to "manually activate" an add-in refers to a user explicitly activating an add-in by clicking on an icon, or keying in a short-cut, or the like. An add-in runs in a non-silent mode when manually activated, displaying a user interface, even if the add-in had been running in a silent mode before the manual activation.

As used herein, "launching" an add-in refers to loading the executable code associated with the add-in into memory and initiating execution. An add-in may be launched automatically when an application loads, e.g., without being activated.

As used herein, "acronym" refers to a series of letters, often capitalized, that refer to a series of words that often begin with letters of the acronym. For example, "EDC" is an acronym, as it may refer to "European Development Center", "AI+R" may refer to Artificial Intelligence and Research, and "NLX" may refer to "Natural Language eXperiences". Acronyms are a type of initialism which forms a pronounceable word—initialisms which are an unpronounceable series of letters are similarly contemplated.

As used herein, "expansion" refers to a series of words associated with the letters of an acronym. For example, "European Development Center" is an expansion for the acronym "EDC". Acronyms may have multiple expansions, e.g. "Error Detection and Correction" and "European Development Center".

As used herein, "section", as in a "section of content", refers to any definitive unit of data, such as a page, side, tab, worksheet, column, row, video segment, audio segment, paragraph, sentence, line, column, etc.

As used herein, "visual cue" refers to one or more graphical elements indicating where an icon associated with the add-in is located within a menu.

As used herein, "icon" refers to a graphical element that can be activated by a user, e.g. by clicking on the graphical element or pressing keyboard shortcut. An icon may be included in a menu item.

As used herein, "menu item" refers to an individual element of a menu group that is associated with application behavior, e.g. saving a file, inserting a symbol, or launching an add-in.

As used herein, "menu group" refers to a collection of menu items. One example of a menu group is a file menu containing a "New", "Open", "Save", "Save As", and "Close" menu items.

FIG. 1 illustrates an application 102 executing on a computing device 100 containing a memory 101. Application 102 is loaded into memory 101 and has opened document 103. A user interface of application 102 is depicted having a list of top-level menu items 104, including home menu 105, insert menu 106, and add-ins menu 108. One of these menus, e.g. home menu 105, may be displayed at any given time in menu bar 110. However, any other type of menu system is similarly contemplated. Document 103 is loaded into an authoring pane 120. FIG. 1 depicts the state of application 102 immediately after document 103 has been loaded (although application 102 may appear as such at other times).

In one or more of the various embodiments, application 102 may begin launching add-ins in a silent mode. Add-ins may be launched during an application initialization, upon completion of other aspects of application initialization, in response to loading document 103, or the like. In one embodiment, an add-in is launched by loading the add-in into a sandbox that does not support a user interface, initiating execution of the add-in, and providing document content to the add-in or enabling the add-in to retrieve content from the document for pre-processing.

Figure 2:
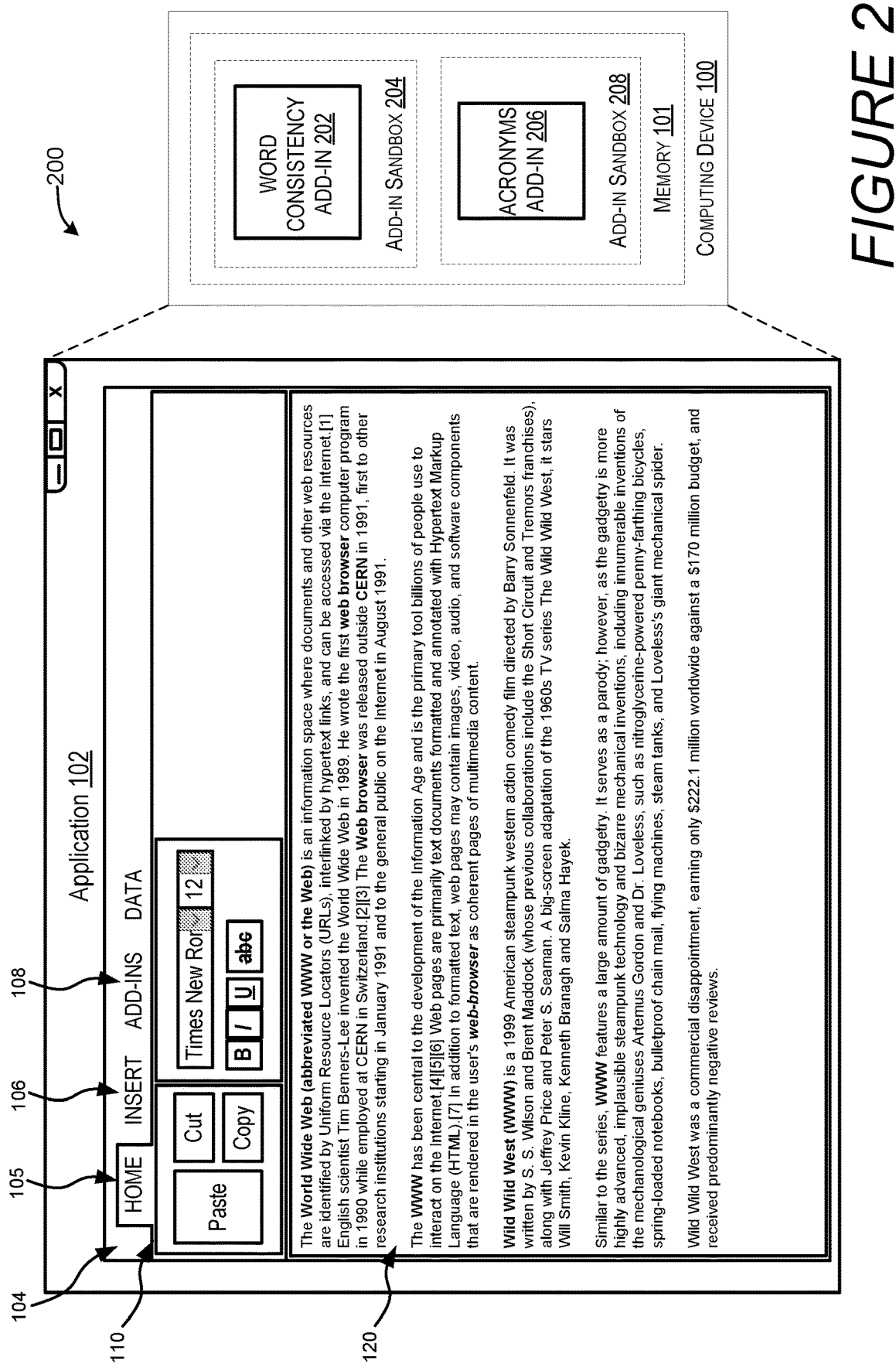
FIG. 2 illustrates the computing device in which a word consistency add-in has been launched within an add-in in an execution sandbox.

FIG. 2 illustrates the computing device 100 in which the word consistency add-in 202 has been launched within add-in sandbox 204, while acronyms add-in 206 has been launched within add-in sandbox 208. In this way, the word consistency add-in 202 and the acronyms add-in 206 have been launched silently, e.g. they execute inside a sandbox, not in the context of an ancillary pane or other user interface. In some embodiments, add-in sandboxes 204 and 208 are loaded within application 102, however add-in sandboxes 204 and 208 may be loaded and execute independent of application 102.

In some embodiments, add-ins running in a silent mode are provided with document content, e.g. the content contained in document 103. In this way, word consistency add-in 202 is enabled to identify different spellings of a word (e.g. "web-browser" and "Web browser") throughout document 103, optionally decorating document 103 with results of this preprocessing. As such, once a user activates an icon associated with word consistency add-in 202, or otherwise activates word consistency add-in 202, the results may be displayed without delay.

One example of decorating document 103 with results of the preprocessing is to associate metadata with sections of document 103 (e.g. characters, words, lines, paragraphs, charts, images, etc.). For example, acronyms add-in 206 may associate an acronym with metadata that lists one or more expansions of that acronym. Similarly, word consistency add-in 202 may associate a canonical spelling of a word with each instance of that word found in document 103 (including non-canonical spellings). Document decorations may be used by an add-in during the current application session to avoid re-processing an item. Additionally or alternatively, document decorations may be saved as part of the document to disk and made available for use by subsequent editing sessions.

Figure 3:
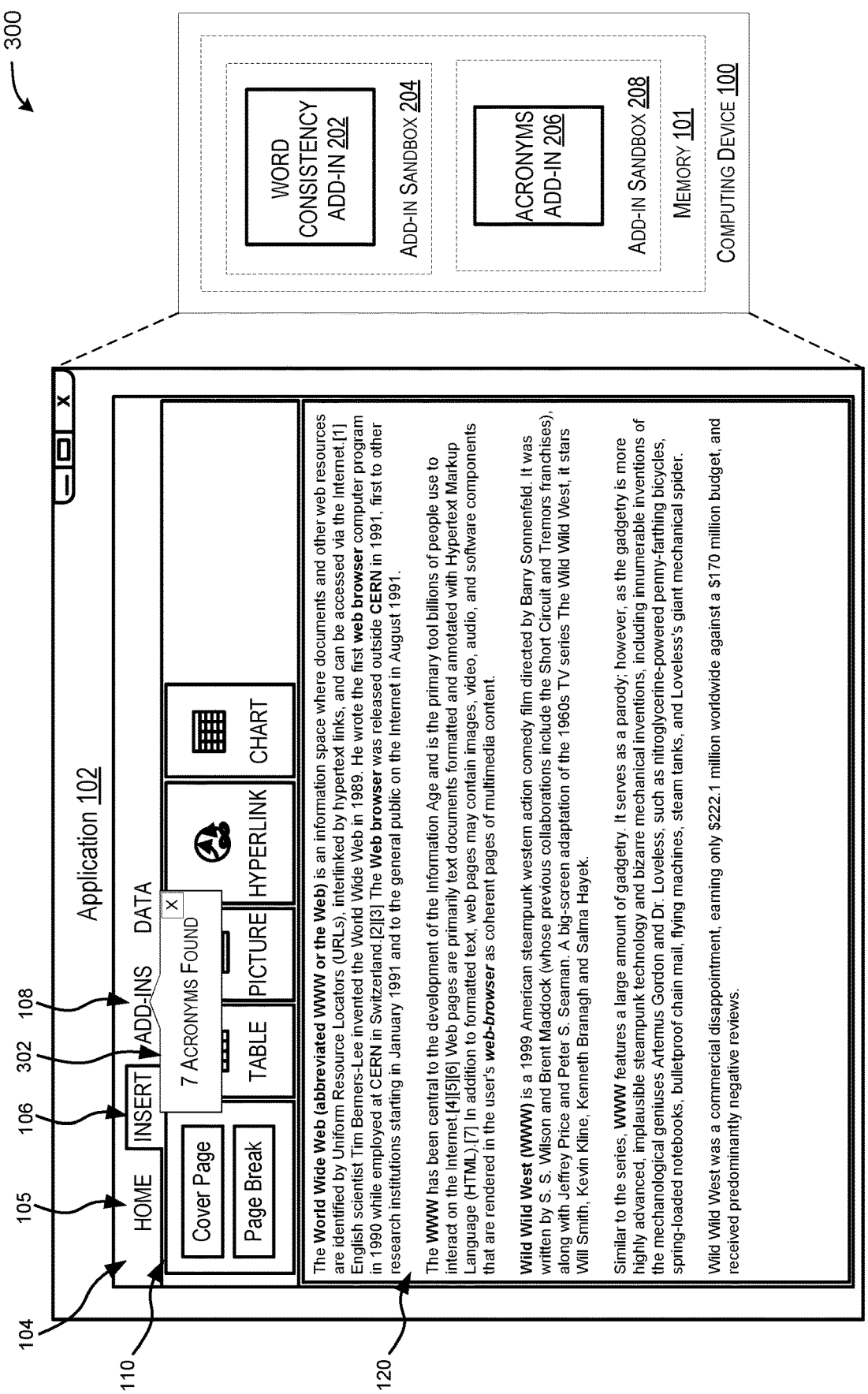
FIG. 3 illustrates a visual cue indicating that an add-in has determined that a criteria has been met.

FIG. 3 illustrates a visual cue 302 indicating that an add-in, e.g. acronyms add-in 206, has determined that a criteria has been met. In some embodiments, the add-in has been running silently, processing existing document content. Furthermore, the add-in may have been processing document content in response to edits in the document, e.g. newly added, updated, or deleted document content. In some embodiments, a determination that the criteria has been met is based in part on an analysis of content within document 103. However, additional criteria may also be contemplated, including whether the add-in has been launched before, whether any add-in has been launched before, whether, or to an extent, content triggering the criteria is currently displayed in authoring pane 120, and the like.

In some embodiments, criteria for determining when to display a visual cue balances one goal of providing users with relevant information with another goal of not annoying or overwhelming users with visual cues. Providing a visual cue every time an add-in identifies a potentially useful piece of information may overwhelm the user, while being too conservative about providing visual cues may cause certain add-ins to be underutilized.

For example, acronyms add-in 206 may have a criteria that after 6 distinct acronyms have been identified within document 103 a visual cue is presented to the user. So, if acronyms add-in 206 determines that 7 distinct acronyms exist in document 103, either upon an initial document-load analysis or based on subsequent document edits, then acronyms add-in 206 will determine that the criteria has been met and display the visual cue.

In other embodiments, a criteria may consider whether content is currently displayed in authoring pane 120. For example, a second criteria associated with acronym add-ins 206 may require that 10 distinct acronyms exist in document 103 or 3 distinct acronyms exist in authoring pane 120. Similarly, a criteria may require that a certain number of distinct acronyms exist in authoring pane 120 without regard to how many distinct acronyms exist in document 103.

By basing a criteria on how many distinct acronyms exist in document 103 or authoring pane 120, users are enabled to enhance comprehension when a large number of distinct acronyms are infrequently used. However, another goal of the claimed embodiments is to improve user comprehension when a small number of acronyms are used frequently throughout the document. To this end, some criteria may be based on a total number of acronyms found within document 103 and/or authoring pane 120, including duplicates. Criteria based on both the number of distinct acronyms and the total number of acronyms are similarly contemplated.

In some embodiments, criteria are subject to modification based on other contextual data. For example, a criteria of acronyms add-in 206 may be modified based on whether an expansion of the acronym is visible within authoring pane 120. For example, if an acronym is displayed within authoring pane 120 alongside the corresponding expansion, the threshold number of acronyms required to satisfy the criteria may be increased. This reflects the observation that users have less use for acronyms add-in 206 when expansions are explicitly defined on the same page as the acronym.

Another modification of acronyms add-in 206 may consider whether an acronym contained within document 103 (or authoring pane 120) has multiple expansions. For example, if the acronym "EDC" is determined to have the expansion "European Development Center" in one section of document 103 but the expansion "Error Detection and Correction" in another section of document 103, the threshold number of acronyms required to satisfy the criteria may be decreased. This reflects the observation that acronyms with ambiguity are inherently more confusing, and so users are more likely to benefit from acronyms add-in 206 when ambiguous acronyms are identified. In some embodiments, the existence of an ambiguous acronym is itself another criteria for displaying visual cue 302.

In some embodiments, a criteria of acronym add-in 206 may be altered based on how often users have responded to previous visual cues generated by add-in 206 and/or visual cues generated by other add-ins. For example, if a user responds to greater than a defined percentage of visual cues, e.g. to more than 75% (although any percentage is contemplated), a threshold number of acronyms required to satisfy the criteria may be decreased or otherwise relaxed, based on the observation that the user finds these visual cues useful, and as such would benefit from more of them. Similarly, if a user has been prompted a defined number of times (e.g. 10, although any number is similarly contemplated), but the user has not subsequently launched acronym add-in 206, application 102 or acronym add-in 206 may increase the threshold of the criteria, or otherwise restrict the criteria, before displaying a subsequent visual cue, or may disallow acronym add-in 206 from presenting any more visual cues at all.

In some embodiments, the visual cue may include an indication of the criteria that triggered it, e.g. "7 acronyms found" as indicated in FIG. 3. However, it is also contemplated that visual cue 302 includes the name of the add-in, or that the visual cue 302 conveys a location of an icon capable of activating the add-in without any additional information.

In some embodiments, the visual cue 302 may be rendered in the form of a pop-up window pointing to a top-level menu item, such as add-ins 108. In this way, not only is the user directed to a means of launching acronyms add-in 206, the user is taught where the icon for this add-in is located, such that the user may later be able to find the icon without the visual cue. However, visual cue 302 may draw attention to the menu containing add-in 206 in other ways, including any combination of highlighting the menu item, animating the menu item to flash, wiggle, zoom, change color, change the font, bold the font, etc.

In some embodiments, the criteria is specific to the particular add-in. For example, a threshold number of acronyms is one example of a criteria applied by the acronyms add-in 206 to determine when sufficient information useful to the user has been gathered. However, word consistency add-in 202 may have a different threshold of inconsistent words found before meeting its criteria. For example, word consistency add-in 202 may require that only 2 inconsistencies are found, or that as many as 10 or more inconsistencies are found, before requesting application 102 display a visual cue indicating as much.

Figure 4:
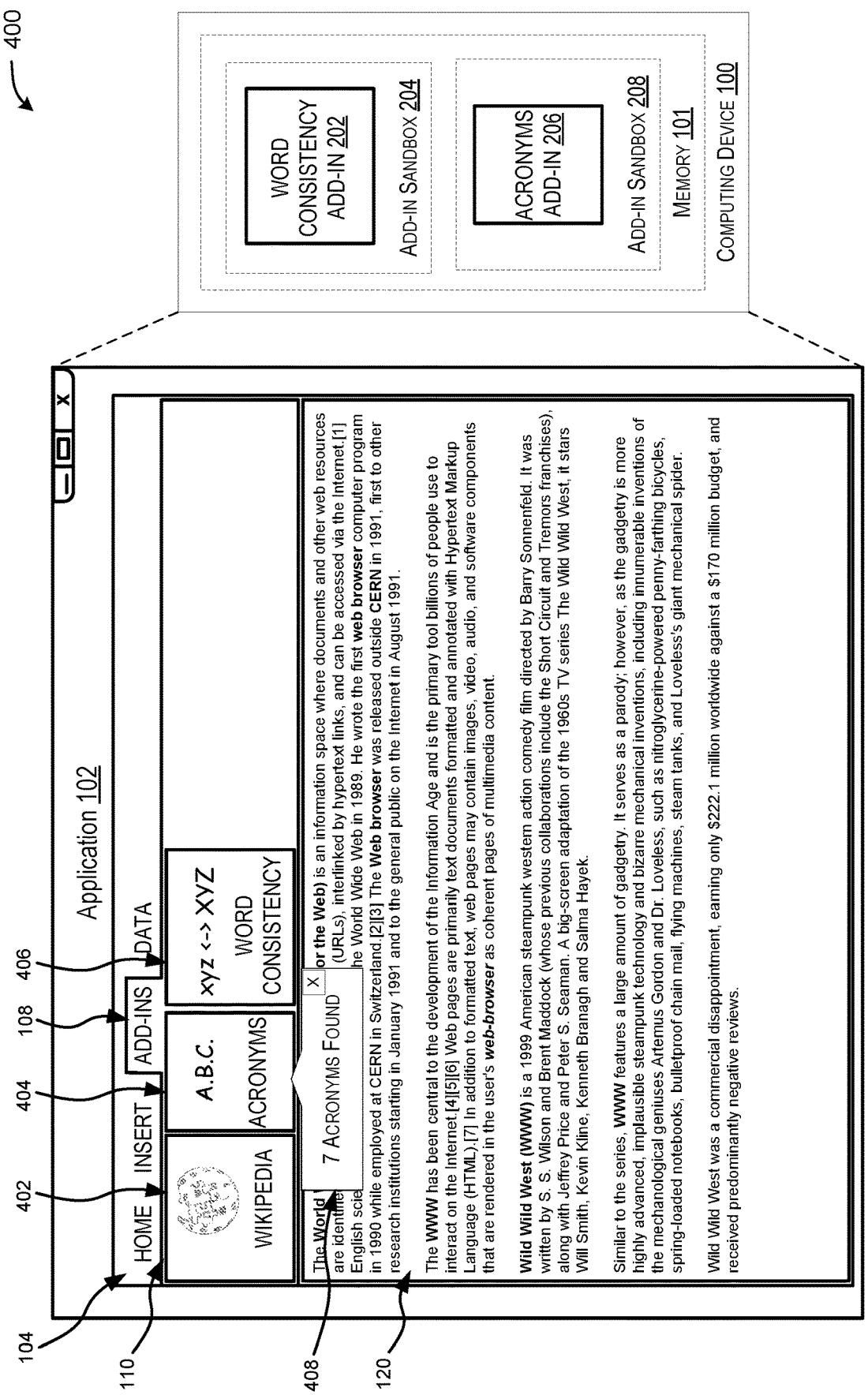
FIG. 4 illustrates the application after a user has activated an add-ins menu item.

FIG. 4 illustrates application 102 after a user has activated add-ins menu 108. Specifically, the contents of the add-ins menu 108, Wikipedia® icon 402, acronyms icon 404, and word consistency acronym 406 are displayed. In some embodiments, the icon of the add-in that requested the visual cue 302 is further highlighted with another visual cue, such as visual cue 408. However, any of the means for rendering a visual cue discussed above are similarly contemplated. Furthermore, additional menu layers are similarly contemplated, such that clicking on top-level menu 108 reveals a second menu level which, which may have a third menu level, etc. At any point in this hierarchy visual cues may direct the user to the associated icon.

Figure 5:
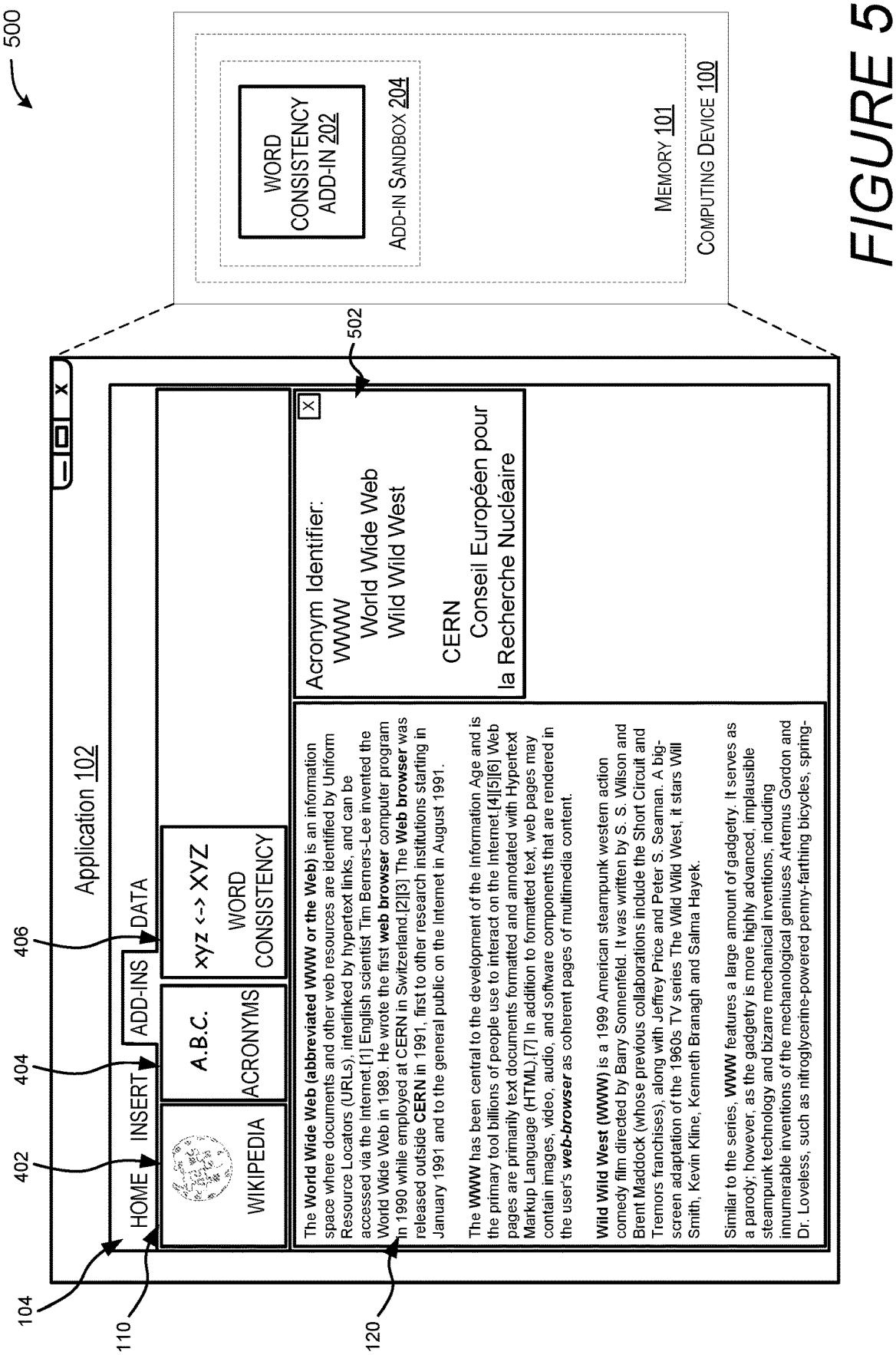

FIG. 5 illustrates application 102 after a user has activated icon 404 associated with acronym add-in 206. In response, acronym add-in 206 (not shown on FIG. 5) generates a user interface in an ancillary pane 502. In this example, acronym add-in 206 depicts a list of acronyms (WWW, CERN) and corresponding expansions ("World Wide Web", "Wild Wild West", "Conseil Européen pour la Recherche Nucléaire"). In some embodiments, these acronyms are extracted from content contained in authoring pane 120, while expansions are received from an acronym processing service that processes sections of text and returns acronyms identified within that text and corresponding expansions. Expansions may or may not be located within the section of text, or even within document 103, but may be retrieved from a dictionary. In some embodiments, a dictionary of acronyms and expansions are derived from documents, emails, calendar events, spreadsheets, webpages, and other documents authored by, delivered to, viewed by, or otherwise related to the user of application 102.

In some embodiments, ancillary pane 502 is displayed quickly in response to user activation of icon 404 based in part on add-in 206 having been initialized in and executed within add-in sandbox 208. As such, in addition to having been downloaded, compiled, and loaded into memory, acronym add-in 206 has been provided with document content before ancillary pane 502 is opened, and often significantly before.

In some embodiments, acronym add-in 206 continues to execute within add-in sandbox 208, even though acronym add-in 206 has begun rendering output to ancillary pane 502 and/or receiving user input.

Figure 6:
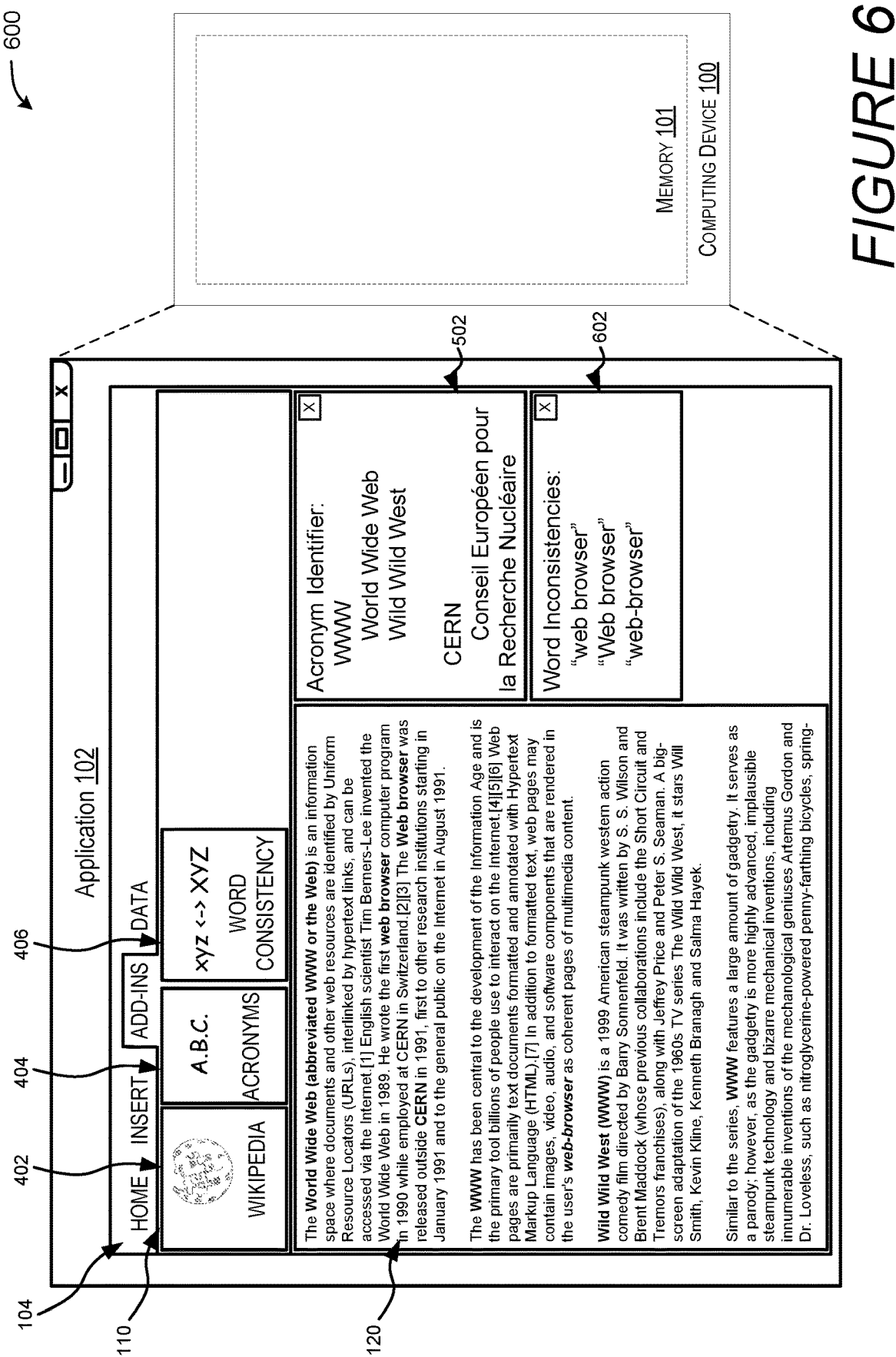

FIG. 6 illustrates application 102 after a user has activated icon 406 associated with word consistency add-in 202 (not shown on FIG. 6). Another ancillary pane 602 is displayed containing content that may have been pre-processed while word consistency add-in 202 was loaded in add-in sandbox 204. In some embodiments, word consistency add-in 202 and acronyms add-in 206 continue to respond to updates to document 103 and authoring pane 120, providing real-time information to the user.

Figure 7:
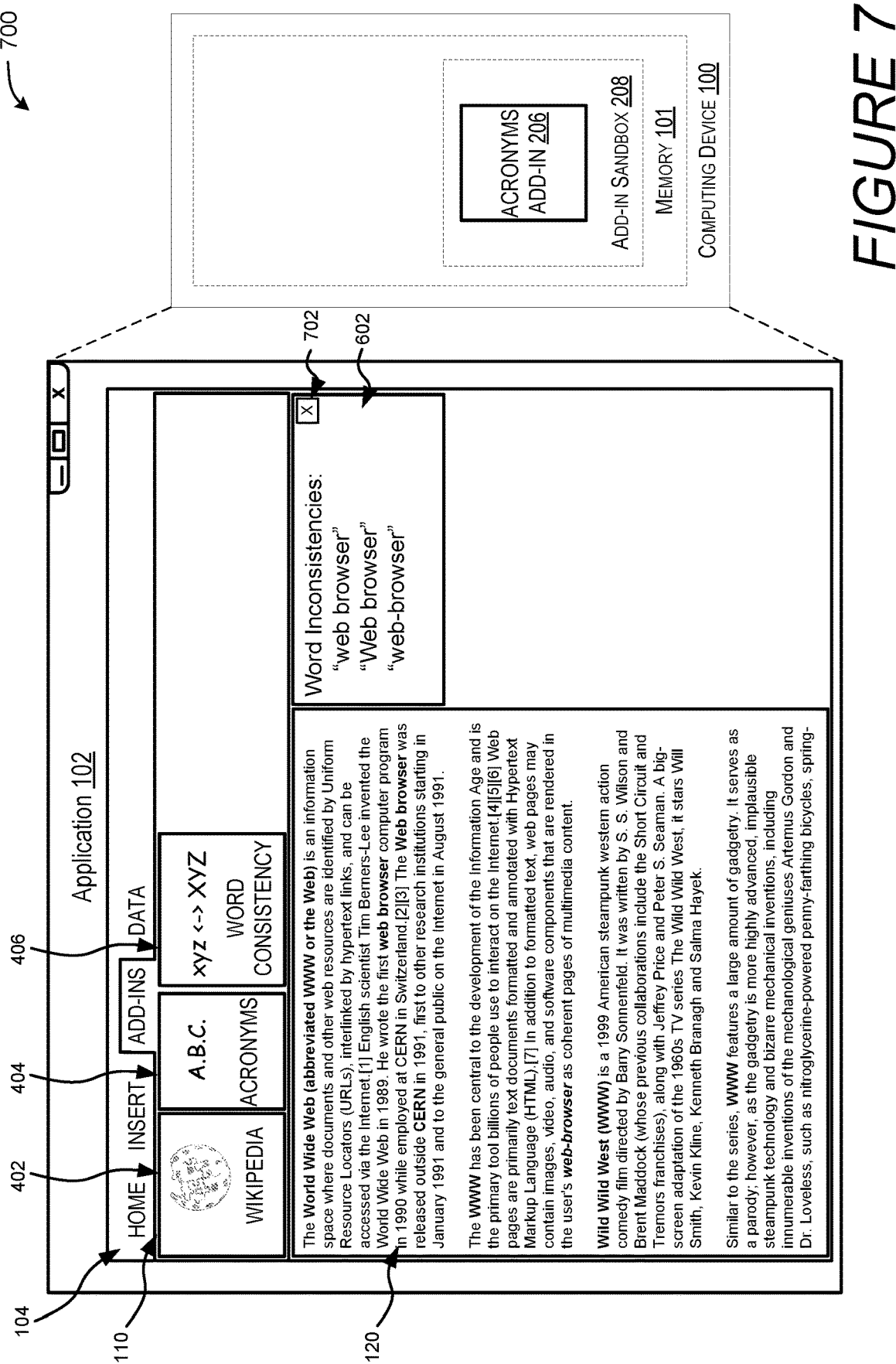
FIG. 7 illustrates the application after a user has de-activated an ancillary pane.

FIG. 7 illustrates application 102 after a user has deactivated ancillary pane 502 (not shown in FIG. 7). In some embodiments, the user may have clicked a 'close' button, e.g. button 702 on the ancillary pane 602. However, any other method of closing a window is similarly contemplated, including sending a keyboard shortcut.

In some embodiments, after ancillary pane 502 has been deactivated, acronyms add-in 206 migrates back to executing in a silent mode in add-in sandbox 208. Acronyms add-in 206 will continue to receive indications of edits to document 103 and indications of what portions of document 103 are currently displayed in authoring pane 120, and continue pre-processing this information in anticipation of the user re-activating the add-in.

Figure 8:
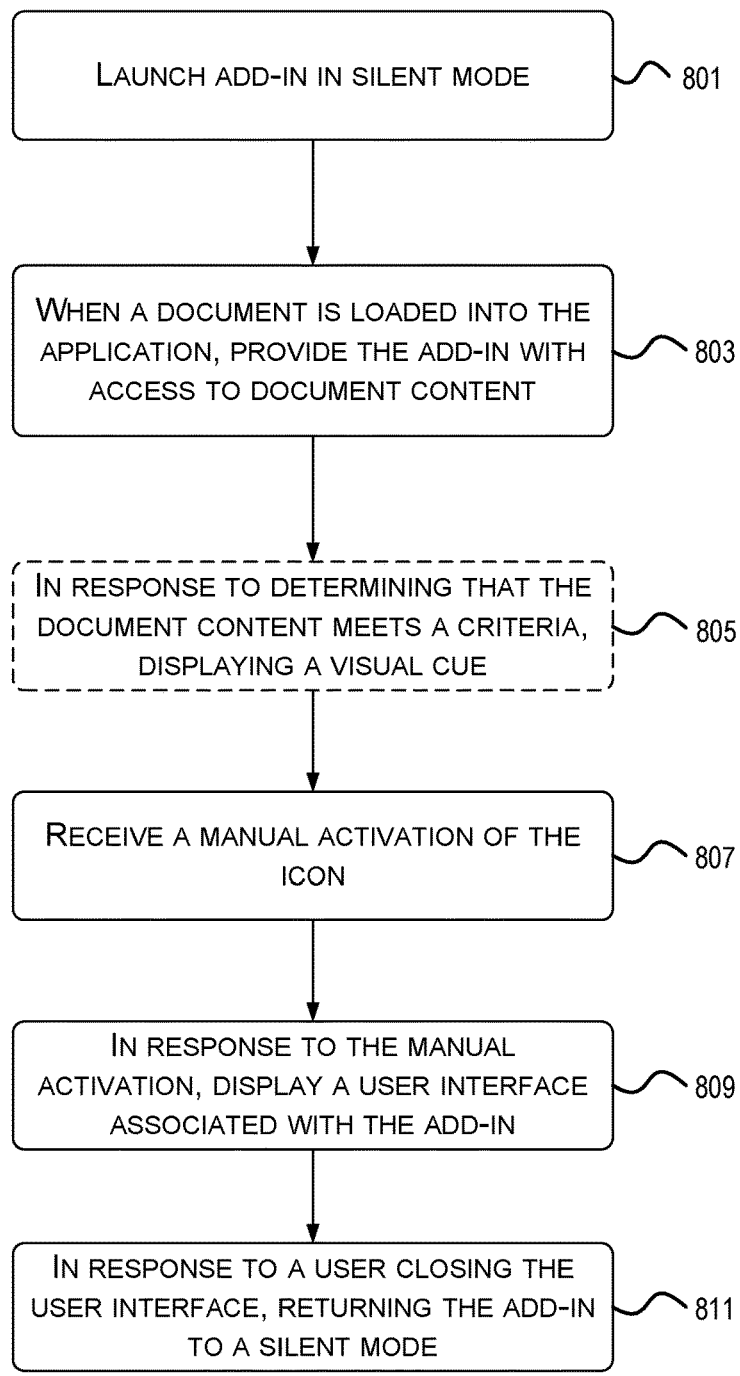
FIG. 8 illustrates aspects of a routine for enabling aspects of the techniques disclosed herein as shown and described below.

Turning now to FIG. 8, aspects of a routine 800 for enabling aspects of the techniques disclosed herein are shown and described below. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 800 are described herein as being implemented, at least in part, by modules running the features disclosed herein and can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine 800 may be also implemented in many other ways. For example, the routine 800 may be implemented, at least in part, by a processor of another remote computer or a local circuit. In addition, one or more of the operations of the routine 800 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 8, the routine 800 begins at operation 801 where the add-in is launched by an application in a silent mode. In some embodiments the add-in is executed in the context of a sandbox that does not have a user interface.

Next, at operation 803, when a document is loaded into the application, the add-in is provided with access to document content. In some embodiments, the add-in is provided with a list of sections of document content, e.g. paragraphs, in response to the document being opened. Additionally or alternatively, the add-in is provided with document content as a whole. In some embodiments, as a user modifies the document, the add-in is provided with document content updates. For example, as a user adds, removes, or modifies sections of the document, the add-in may be provided with each updated section, a section ID, and an indication of the type of modification.

In some embodiments, the add-in performs an analysis on the document while in the silent mode. This analysis may, in addition to the operations described below, be provided to another add-in running within the same application. The other add-in may also be running in a silent mode, or the other add-in may be associated with a display in an ancillary pane.

Next, at operation 805, the add-in optionally determines whether the document content meets a criteria, and in response to making the determination, requests the application display a graphical element indicating where an icon associated with the add-in is located within a menu. In some embodiments, the graphical element is a visual cue, e.g. a popup displayed proximate to a top level menu where an icon associated with the add-in is located.

In some embodiments, meeting the criteria indicates that the add-in has identified information that may be useful to the user. When the document content meets the criteria, the add-in may optionally indicate to the application why the criteria was met, how the criteria was met, why the information might be useful to a user, or other information to display with the graphical element.

Additionally or alternatively, the graphical element may enable a user to directly activate the add-in, without the user having to navigate the application menu to locate and activate the icon. In one embodiment, the graphical element includes a button clickable by the user to activate the add-in.

In some embodiments, the add-in may be automatically activated, without user input, when an additional (e.g. stricter) criteria is met. In some embodiments the additional criteria may be defined in a configuration file, based on user input, of based on a usage history of the user, etc. The additional criteria may be an absolute criteria, e.g. 25 distinct acronyms identified within a document, or the additional criteria may be related to the criteria that triggers a visual cue, e.g. twice the number of distinct acronyms that trigger a visual cue. Furthermore, the additional criteria may be altered based on user behavior, such as becoming less strict as a user is determined to open suggested add-ins at a higher rate than other users, based on the intuition that a user who responds positively to visual cues may wish to immediately activate the add-in.

In some embodiments, the criteria or the additional criteria may include a timeliness component. For example, the criteria or the additional criteria may become looser (i.e. easier to satisfy) if the conditions that meet the criteria are determined to be fleeting.

Next, at operation 807, a manual activation of the icon associated with the add-in menu is received. In some embodiments the manual activation comprises a mouse click, a keyboard shortcut, a voice command, or any other means of human input.

Next, at operation 809, in response to the manual activation, a user interface associated with the add-in is displayed. In some embodiments, the user interface is displayed in an ancillary pane, such as a task pane, enabling the add-in to present to the user information related to the criteria.

Next, at operation 811, in response to the user interface associated with the add-in being closed, the application continues to execute the add-in in a silent mode. In some embodiments, the add-in is de-activated, returned to executing in a sandbox (e.g. add-in sandbox 208), in a silent mode. However, the add-in remains launched, in that it is loaded, instantiated, has access to document content, may decorate the document with metadata, etc. In this way, the add-in may continue to process document update events in anticipation of the add-in being re-activated by the user.

Figure 9:
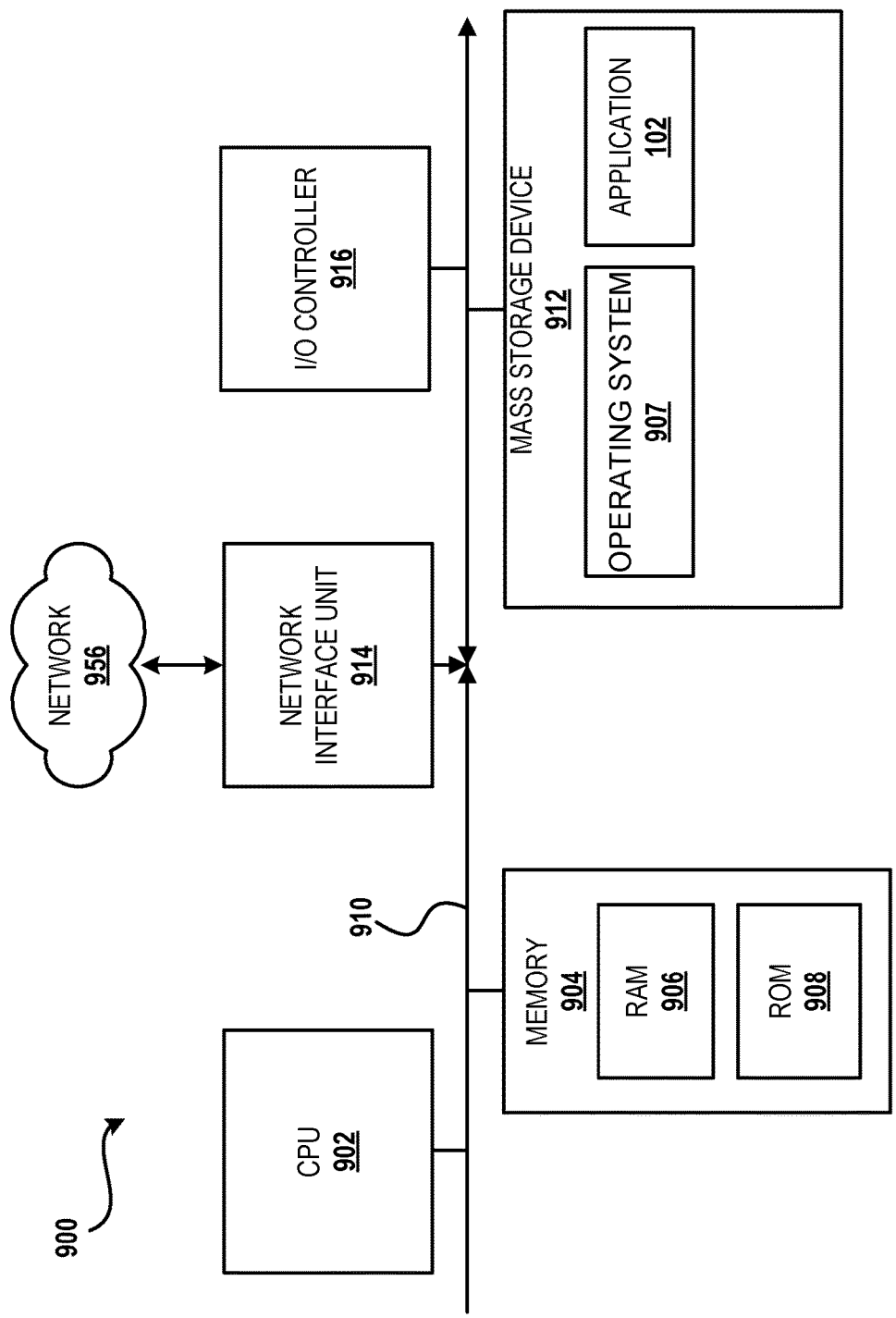
FIG. 9 is a computer architecture diagram illustrating an illustrative computer hardware and software architecture for a computing system capable of implementing aspects of the techniques and technologies presented herein.

FIG. 9 shows additional details of an example computer architecture 900 for a computer, such as a computing device executing application 102 (FIG. 1), capable of executing the program components described herein. Thus, the computer architecture 900 illustrated in FIG. 9 illustrates an architecture for a server computer, a mobile phone, a PDA, a smart phone, a desktop computer, a netbook computer, a tablet computer, and/or a laptop computer. The computer architecture 900 may be utilized to execute any aspects of the software components presented herein.

The computer architecture 900 illustrated in FIG. 9 includes a central processing unit 902 ("CPU"), a system memory 904, including a random access memory 906 ("RAM") and a read-only memory ("ROM") 908, and a system bus 910 that couples the memory 904 to the CPU 902. A basic input/output system containing the basic routines that help to transfer information between elements within the computer architecture 900, such as during startup, is stored in the ROM 908. The computer architecture 900 further includes a mass storage device 912 for storing an operating system 907, other data, and one or more application programs 102.

The mass storage device 912 is connected to the CPU 902 through a mass storage controller (not shown) connected to the bus 910. The mass storage device 912 and its associated computer-readable media provide non-volatile storage for the computer architecture 900. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 900.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 900. For purposes of the claims, the phrase "computer storage medium," "computer-readable storage medium" and variations thereof, does not include waves, signals, and/or other transitory and/or intangible communication media, per se.

According to various configurations, the computer architecture 900 may operate in a networked environment using logical connections to remote computers through the network 956 and/or another network (not shown). The computer architecture 900 may connect to the network 956 through a network interface unit 914 connected to the bus 910. It should be appreciated that the network interface unit 914 also may be utilized to connect to other types of networks and remote computer systems. The computer architecture 900 also may include an input/output controller 916 for receiving and processing input from a number of other devices, including a keyboard, mouse, or electronic stylus (not shown in FIG. 9). Similarly, the input/output controller 916 may provide output to a display screen, a printer, or other type of output device (also not shown in FIG. 9).

It should be appreciated that the software components described herein may, when loaded into the CPU 902 and executed, transform the CPU 902 and the overall computer architecture 900 from a general-purpose computing system into a special-purpose computing system customized to facilitate the functionality presented herein. The CPU 902 may be constructed from any number of transistors or other discrete circuit elements, which may individually or collectively assume any number of states. More specifically, the CPU 902 may operate as a finite-state machine, in response to executable instructions contained within the software modules disclosed herein. These computer-executable instructions may transform the CPU 902 by specifying how the CPU 902 transitions between states, thereby transforming the transistors or other discrete hardware elements constituting the CPU 902.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 900 in order to store and execute the software components presented herein. It also should be appreciated that the computer architecture 900 may include other types of computing devices, including hand-held computers, embedded computer systems, personal digital assistants, and other types of computing devices known to those skilled in the art. It is also contemplated that the computer architecture 900 may not include all of the components shown in FIG. 9, may include other components that are not explicitly shown in FIG. 9, or may utilize an architecture completely different than that shown in FIG. 9.

The disclosure presented herein also encompasses the subject matter set forth in the following clauses:

Example A

A method for executing an add-in (202) in association with an application (102), comprising: launching the add-in (202) in a silent mode in coordination with a launch of the application (102), the application (102) generating a menu item (406) within a menu group (108) of the application (102), wherein the add-in is executed in an execution environment (204) that enables access to content of a document (103); receiving an indication from the add-in (202) that the document (103) meets a criteria; in response to the indication that the document (103) meets the criteria, displaying a notification (302) drawing attention to the menu item (406); receiving a user activation of the menu item (406); and in response to the user activation of the menu item (202), transitioning the add-in (202) out of the silent mode by displaying a user interface (602) generated by the add-in (202).

Example B

The method of Example A, wherein, when the menu group is not displayed, the notification includes a visual cue proximate to a top-level menu item of the menu group.

Example C

The method of any one of Examples A-B, wherein, when the menu group is displayed, the notification includes a visual cue proximate to the menu item.

Example D

The method of any one of Examples A-C, wherein the notification includes an indication of how the document has met the criteria.

Example E

The method of any one of Examples A-D, wherein the user interface includes an ancillary pane displaying content derived in part from content used to determine the document met the criteria.

Example F

The method of any one of Examples A-E, wherein the notification includes a button that when activated takes the add-in out of the silent mode.

Example G

The method of any one of Examples A-F, wherein the notification includes an audio cue, an animation, a color change, a font change, a font characteristic change, or a graphical overlay.

Example H

The method of any one of Examples A-G, wherein displaying the notification includes transitioning the add-in out of the silent mode by displaying the user interface generated by the add-in.

Example I

A computing device for executing an add-in (202) in association with an application (102), the computing device comprising: one or more processors; a memory in communication with the one or more processors, the memory having computer-readable instructions stored thereupon which, when executed by the one or more processors, cause the computing device to: launch the add-in (202) in a silent mode during a launch of the application (102), including generating a menu item (406) within a menu group (108) of the application (102) and executing the add-in (202) in an execution environment (204) that enables access to content of a document (103) loaded into the application (102) but does not display a user interface generated by the add-in (202); receive an indication from the add-in (202) that the document (102) meets a criteria for drawing attention to the add-in (202); in response to the indication that the document (102) meets the criteria for drawing attention to the add-in (202), displaying a notification (302) drawing attention to the menu item (406); receive a user activation of the menu item (406); in response to the user activation of the menu item (406), take the add-in (202) out of the silent mode by displaying a user interface (602) generated by the add-in (202); and when the user interface (602) is closed, return the add-in (202) to the silent mode.

Example J

The method of Example I, wherein the criteria includes, within the document, a defined number of distinct acronyms or a defined number of total acronym instances.

Example K

The method of Example J, wherein the defined number of distinct acronyms or the defined number of total acronyms is reduced when an acronym is determined to have multiple expansions.

Example L

The method of Example J, wherein the defined number of distinct acronyms or the defined number of total acronyms is increased when an expansion of an acronym is displayed in authoring pane.

Example M

The method of any one of Examples I-L, wherein the criteria is relaxed based in part on a determination that a user has responded to greater than a defined percentage of previous notifications.

Example N

The method of any one of Examples I-L, wherein the criteria is restricted based in part on a determination that a user has been presented with a defined number of notifications without responding them.

Example O

A method for executing an add-in (202) in association with an application (102), comprising: launching the add-in (202) in a silent mode during a launch of the application (102), including generating a menu item (406) within a menu group (108) of the application and executing the add-in (202) in an execution environment (204) that enables access to content of a document (103) loaded into the application (102) but does not display a user interface generated by the add-in; receiving a user activation of the menu item (406); and in response to the user activation of the menu item (406), taking the add-in (202) out of the silent mode by displaying a user interface (602) generated by the add-in (202).

Example P

The method of Example O, wherein the user interface is displayed in an ancillary pane apart from the application.

Example Q

The method of any one of Examples O-P, further comprising: providing the add-in with an initial state of the document and events indicating when the document or a section of the document has changed while the add-in is in the silent mode.

Example R

The method of Example Q, wherein the events indicate the section of the document has been newly added, updated, or deleted.

Example S

The method of any one of Examples O-R, further comprising: receiving metadata associated with a section of content of the document from the add-in; storing the received metadata in the document; and on a subsequent launch of the add-in, providing the stored metadata to the add-in in the silent mode.

Example T

The method of any one of Examples O-S, including: receiving an indication from the add-in that the document meets a criteria for drawing attention to the add-in; and in response to the indication that the document meets the criteria for drawing attention to the add-in, displaying a notification (302) drawing attention to the menu item.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method for executing an add-in in association with an application, comprising:
    launching the add-in in a silent mode in coordination with a launch of the application, the application generating a menu item within a menu group of the application, wherein the add-in is executed in an execution environment that enables access to content of a document;
    receiving, at the application and based on an analysis of the content of the document performed by the add-in, an indication that the content of the document meets a criteria for drawing attention to the menu item;
    in response to the indication that the document meets the criteria, displaying a notification drawing attention to the menu item;
    receiving a user activation of the menu item; and
    in response to the user activation of the menu item, transitioning the add-in out of the silent mode by displaying a user interface generated by the add-in.

2. The method of claim 1, wherein, when the menu group is not displayed, the notification includes a visual cue proximate to a top-level menu item of the menu group.

3. The method of claim 1, wherein, when the menu group is displayed, the notification includes a visual cue proximate to the menu item.

4. The method of claim 1, wherein the notification includes an indication of how the document has met the criteria.

5. The method of claim 4, wherein the user interface includes an ancillary pane displaying content derived in part from content used to determine the document met the criteria.

6. The method of claim 1, wherein the notification includes a button that when activated takes the add-in out of the silent mode.

7. The method of claim 1, wherein the notification includes an audio cue, an animation, a color change, a font change, a font characteristic change, or a graphical overlay.

8. The method of claim 1, wherein displaying the notification includes transitioning the add-in out of the silent mode by displaying the user interface generated by the add-in.

9. A computing device for executing an add-in in association with
    an application, the computing device comprising:
    one or more processors;
    a memory in communication with the one or more processors, the memory having computer-readable instructions stored thereupon which, when executed by the one or more processors, cause the computing device to:
        launch the add-in in a silent mode, wherein launching the add-in in a silent mode includes:
            generating a menu item associated with the add-in in a menu structure of the application, and
            executing the add-in in an execution environment that enables access to content of a document loaded into the application but does not display a user interface generated by the add-in;
        receive, at the application and based on an analysis of the content of the document performed by the add-in, an indication that the content of the document meets a criteria for drawing attention to the add in;
        in response to the indication that the document meets the criteria for drawing attention to the add-in, display a notification drawing attention to the menu item proximate to the menu item or a top-level menu where the menu item is located;
        after the notification has been displayed, receive a user activation of the menu item;
        in response to the user activation of the menu item, take the add-in out of the silent mode by displaying a user interface generated by the add-in; and
        when the user interface generated by the add-in is closed, return the add-in to the silent mode.

10. The method of claim 9, wherein the criteria includes, within the document, a defined number of distinct acronyms or a defined number of total acronym instances.

11. The method of claim 10, wherein the defined number of distinct acronyms or the defined number of total acronyms is reduced when an acronym is determined to have multiple expansions.

12. The method of claim 10, wherein the defined number of distinct acronyms or the defined number of total acronyms is increased when an expansion of an acronym is displayed in the authoring pane.

13. The method of claim 9, wherein the criteria is relaxed based in part on a determination that a user has responded to greater than a defined percentage of previous notifications.

14. The method of claim 9, wherein the criteria is restricted based in part on a determination that a user has been presented with a defined number of notifications without responding to them.

15. A method for executing an add-in in association with an application, comprising:

launching the add-in in a silent mode during a launch of the application, including generating a menu item within a menu group of the application and executing the add-in in an execution environment that enables access to content of a document loaded into the application but does not display a user interface generated by the add-in;

receiving, at the application and based on an analysis of the content of the document performed by the add-in, an indication that the content of the document meets a criteria for drawing attention to the add in;

in response to the indication that the document meets the criteria for drawing attention to the add-in, displaying a notification proximate to the menu item or the menu group, wherein the notification includes an indication of how the document has met the criteria;

receiving a user activation of the menu item; and in response to the user activation of the menu item, taking the add-in out of the silent mode by displaying a user interface generated by the add-in.

16. The method of claim 15, wherein the user interface is displayed in an ancillary pane apart from the application.

17. The method of claim 15, further comprising:

providing the add-in with an initial state of the document and events indicating when the document or a section of the document has changed while the add-in is in the silent mode.

18. The method of claim 17, wherein the events indicate the section of the document has been newly added, updated, or deleted.

19. The method of claim 15, further comprising:

receiving metadata associated with a section of content of the document from the add-in;

storing the received metadata in the document; and on a subsequent launch of the add-in, providing the stored metadata to the add-in in the silent mode.

* * * * *